F. & N. M. SPRANGER.
DEMOUNTABLE RIM.
APPLICATION FILED SEPT. 30, 1915.
1,209,509.
Patented Dec. 19, 1916.
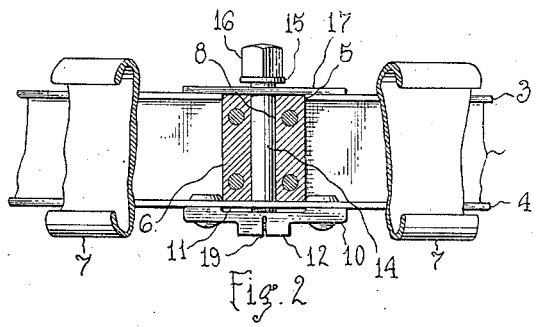
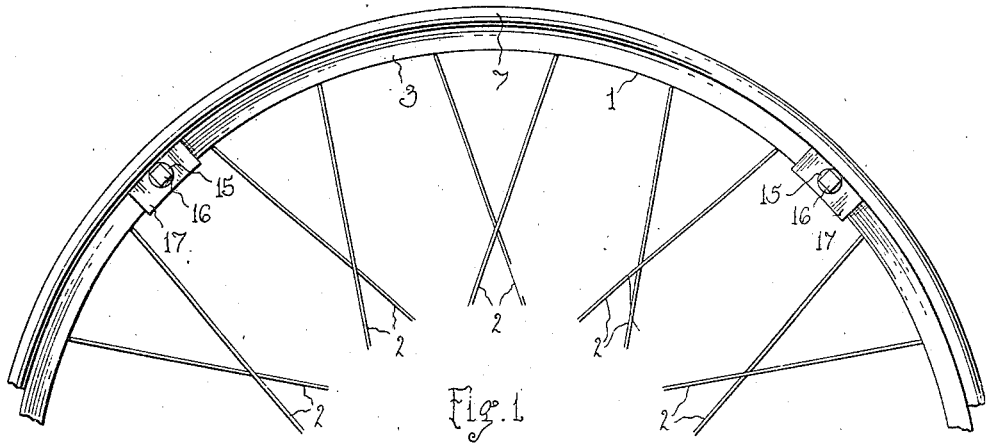
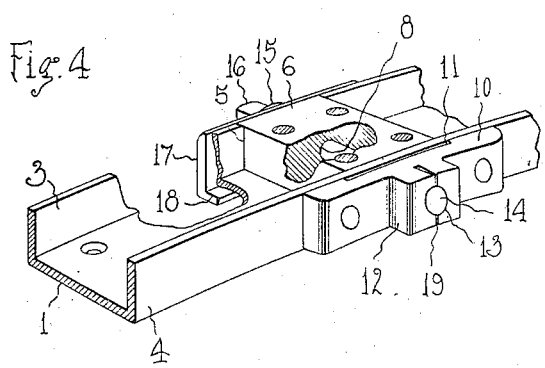
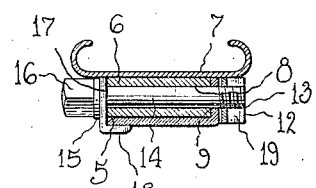
Witnesses
Anna M Dorr.
Arthur F. Draper.
Inventors
Frank Spranger
Nicholas M Spranger
By
Attorneys

UNITED STATES PATENT OFFICE.

FRANK SPRANGER AND NICHOLAS M. SPRANGER, OF DETROIT, MICHIGAN, ASSIGNORS TO SPRANGER RIM AND WHEEL CO., OF DETROIT, MICHIGAN, A CORPORATION OF MICHIGAN.

DEMOUNTABLE RIM.

1,209,509.   Specification of Letters Patent.   Patented Dec. 19, 1916.

Application filed September 30, 1915. Serial No. 53,383.

*To all whom it may concern:*

Be it known that we, FRANK SPRANGER and NICHOLAS M. SPRANGER, citizens of the United States of America, residing at Detroit, in the county of Wayne and State of Michigan, have invented certain new and useful Improvements in Demountable Rims, of which the following is a specification, reference being had therein to the accompanying drawings.

The present invention is an improvement in connection with Patent No. 1,069,349, granted Aug. 5, 1913 and Patent No. 1,120,913, granted March 2, 1915, these patents disclosing demountable rims for vehicle wheels and including novel means whereby a demountable rim can be easily and quickly attached to a fixed rim.

This invention aims to provide more reliable and simple means for connecting a demountable rim to a fixed rim than what has heretofore been used, said means including spaced members on a demountable rim which prevent circumferential shifting of the demountable rim relative to the fixed rim; connecting members which prevent lateral displacement of the demountable rim relative to the fixed rim, and clamping members which prevent accidental displacement of the connecting members, said clamping members constituting automatic bolt locking means.

The mechanical construction by which we attain the above will be hereinafter described and then claimed, reference will now be had to the drawing, wherein—

Figure 1 is a side elevation of a portion of a wheel provided with a demountable rim in accordance with our invention; Fig. 2 is a plan of a portion of the same, partly broken away and partly in section; Fig. 3 is a cross sectional view of a fixed rim with a demountable rim connected thereto, and Fig. 4 is a perspective view of a portion of a fixed rim showing a portion of the demountable rim held thereby.

In the drawing, the reference numeral 1 denotes a channel rim to which are connected spokes 2 and this fixed rim has a peripheral outer flange 3 and a peripheral inner flange 4. The outer flange 3 has a plurality of openings 5 providing clearance for spaced members 6 riveted or otherwise connected to a demountable rim 7. The demountable rim 7 is of a conventional tire holding type having peripheral side flanges or clencher edges and said demountable rim is adapted to slide laterally upon the outer edges of the flanges 3 and 4 of the fixed rim, with the spaced members 6 within the fixed rim, against the inner wall of the flange 4, and closing the openings 5 of the outer flange 3. The spaced members 6 are preferably rectangular and are provided with longitudinal bores 8 alining with openings 9 in the inner flange 4 of the fixed rim 1.

Riveted or otherwise connected to the outer wall of the inner flange 4 of the fixed rim, at the sides of each of the openings 9 of said flange, are the ends of a clamping member 10 made of malleable metal. The inner face of the clamping member 10 is cut away, as at 11, whereby the clamping member will bridge or span the opening 9 and permit of the central portion of said member being sprung inwardly toward the outer wall of the flange 4. The outer face of the clamping member 10 has a protuberance or boss 12 and said member and boss have an opening 13 with the walls thereof screw-threaded, said opening alining with the opening 9 of the flange 4 and the bore 8 of the member 6, whereby a bolt 14 can be placed in the bore 8, the opening 9, and screwed into the opening 13 of the clamping member. The outer end of the bolt 14 has a collar 15 and a head 16, the latter accommodating a spanner wrench or suitable implement employed for rotating the bolt 14. The collar 15 is adapted to engage an angle clip 17 placed upon the bolt prior to its insertion in the spaced member 6. The angle clip 17 is of greater area than the opening 5 of the flange 3 and said angle clip has a lateral flange 18 extending under the fixed rim 1 and preventing the angle clip 17 from rotating with the bolt 14, while said clip permits of the spaced member 6 being firmly gripped when the bolt 14 is tightened.

The boss 12 of the clamping member is bifurcated or slitted, as at 19, the slit intersecting the opening 13 and thereby dividing the boss into two retractable or distensible members. The slit 19 of the boss 12 coöperates with the cut away portion 11 thereof in permitting the central portion of the clamping member being sprung when the bolt 14 is screwed into the clamping member and the collar 15 of the bolt jammed against the clip 17. As the bolt is screwed into position to lock the spaced member 6 in the fixed rim, the halves or members of the boss 12 are retracted, thereby binding against the thread of the bolt 14 and serving functionally as a bolt locking device. The bolt cannot become accidentally displaced and the boss 12 obviates the necessity of screwing a nut upon the inner end of the bolt to hold the same in place.

The construction just disclosed can be advantageously used in connection with wire vehicle wheels for automobiles and obviates the necessity of carrying an extra wire wheel for emergency purposes, insomuch that a fully equipped demountable rim can be carried and easily and quickly substituted for a wheel rim having a punctured or otherwise injured tire. The channel fixed rim permits of wire spokes being properly connected to the same and the manner of connecting the demountable rim to the channel fixed rim insures rigidity and a wheel periphery that is comparatively light in weight, yet possessing the features by which safety and durability are secured.

One embodiment of our invention has been illustrated, but it is to be understood that the structural elements are susceptible to such variations and modifications as fall within the scope of the appended claims.

What we claim is:—

1. The combination of a fixed channel rim, a demountable rim adapted to fit thereon, spaced members carried by said demountable rim adapted to extend into said fixed channel rim with the ends of each member abutting the inner walls of said fixed channel rim, clips at the outer side of said fixed channel rim, clamping members on the inner side of said fixed channel rim, fastening means for said clamping members fixed to said rim at the sides of said spaced members, said clamping members having central yieldable boss portions, and bolts adapted to extend through said clips and said spaced members and engage between said boss portions to spring said boss portions toward said rim so that said bolts will become automatically locked therebetween by turning said bolts against said clips.

2. In a wheel, a fixed channel rim, clamping members at the inner side of said fixed channel rim, fastening means connecting said clamping members to said fixed channel rim and protruding therein, a demountable rim adapted to fit on said fixed channel rim, members carried by said demountable rim and adapted to fit in said fixed channel rim, between the fastening means of said clamping members, and bolts extending through said fixed channel rim and said members into said clamping members.

In testimony whereof we affix our signatures in presence of two witnesses.

FRANK SPRANGER.
NICHOLAS M. SPRANGER.

Witnesses:
OTTO F. BARTHEL,
G. E. McGRANN.